US011965364B2

(12) United States Patent
Müller

(10) Patent No.: US 11,965,364 B2
(45) Date of Patent: Apr. 23, 2024

(54) MOTOR VEHICLE LOCK WITH BRAKING ELEMENT

(71) Applicant: Kiekert AG, Heiligenhaus (DE)

(72) Inventor: Dorothea Müller, Essen (DE)

(73) Assignee: Kiekert AG, Heiligenhaus (DE)

( * ) Notice: Subject to any disclaimer, the term of this patent is extended or adjusted under 35 U.S.C. 154(b) by 222 days.

(21) Appl. No.: 16/641,859

(22) PCT Filed: Sep. 3, 2018

(86) PCT No.: PCT/DE2018/100746
§ 371 (c)(1),
(2) Date: Feb. 25, 2020

(87) PCT Pub. No.: WO2019/047999
PCT Pub. Date: Mar. 14, 2019

(65) Prior Publication Data

US 2020/0217106 A1 Jul. 9, 2020

(30) Foreign Application Priority Data

Sep. 5, 2017 (DE) ..................... 10 2017 120 340.0

(51) Int. Cl.
*E05B 77/38* (2014.01)
*E05B 77/42* (2014.01)
*E05F 5/02* (2006.01)

(52) U.S. Cl.
CPC .............. *E05B 77/38* (2013.01); *E05B 77/42* (2013.01); *E05F 5/025* (2013.01)

(58) Field of Classification Search
CPC .......... E05B 77/36; E05B 77/38; E05B 77/40; E05B 77/42; E05B 85/20; E05B 85/24;
(Continued)

(56) References Cited

U.S. PATENT DOCUMENTS 4,358,141 A * 11/1982 Hamada .................. E05B 77/38 292/216
4,904,004 A * 2/1990 Bartczak ................. E05B 79/20 292/201

(Continued)

FOREIGN PATENT DOCUMENTS

DE 2641341 A1 3/1977
DE 4420185 A1 12/1995

(Continued)

OTHER PUBLICATIONS

Computer Generated Translation for DE 19652012 A1, Generated on Nov. 30, 2021, https://worldwide.espacenet.com/ (Year: 2021).*

(Continued)

*Primary Examiner* — Alyson M Merlino

(74) *Attorney, Agent, or Firm* — Renner, Otto, Boisselle & Sklar, LLP

(57) ABSTRACT

A motor vehicle lock for a movable vehicle part, in particular for a door, flap, tailgate, or bonnet, said lock having a lock housing and a rotary latch that is movably provided on the lock housing, and the rotary latch being movable into an open position and at least one engaged position. In addition, at least on buffer unit is provided on the lock housing and at least on braking element is located on the buffer unit, such that at least some portions of the braking element can be brought into contact with the rotary latch, at least while the rotary latch is moving into the open position.

14 Claims, 2 Drawing Sheets

(58) Field of Classification Search
CPC .. E05B 85/243; E05B 85/26; Y10T 292/1047; Y10T 292/1078; Y10T 292/1082; Y10T 292/688; Y10T 292/691; Y10S 292/23; Y10S 292/38; Y10S 292/56; Y10S 292/57; Y10S 292/73
See application file for complete search history.

(56) References Cited

U.S. PATENT DOCUMENTS

| | | | | | |
|---|---|---|---|---|---|
| 5,181,754 | A * | 1/1993 | Shibata | E05B 85/243 | 292/216 |
| 5,520,426 | A * | 5/1996 | Arabia, Jr. | E05B 77/38 | 292/337 |
| 6,749,234 | B2 * | 6/2004 | Bruce | E05B 77/38 | 292/216 |
| 7,090,264 | B2 * | 8/2006 | Dzurko | E05B 85/243 | 292/201 |
| 7,552,951 | B2 * | 6/2009 | Kim | E05B 83/32 | 292/121 |
| 8,342,582 | B2 * | 1/2013 | Bendel | E05B 77/38 | 292/216 |
| 8,348,310 | B2 * | 1/2013 | Vazquez | E05B 85/26 | 292/217 |
| 9,249,607 | B2 * | 2/2016 | Akizuki | E05B 77/38 | |
| 9,422,754 | B2 * | 8/2016 | Graute | E05B 77/38 | |
| 10,280,660 | B2 * | 5/2019 | Nozawa | E05B 77/38 | |
| 10,450,782 | B2 * | 10/2019 | Nurmi | E05B 77/38 | |
| 2005/0062295 | A1 | 3/2005 | Ketelsen et al. | | |
| 2005/0073156 | A1 * | 4/2005 | Oh | E05B 77/38 | 292/216 |
| 2009/0224559 | A1 * | 9/2009 | Park | E05B 77/38 | 292/336.3 |

FOREIGN PATENT DOCUMENTS

| | | | | | |
|---|---|---|---|---|---|
| DE | 19652012 | A1 | | 6/1998 | |
| DE | 202005010526 | U1 | | 9/2005 | |
| DE | 102006028423 | A1 | | 12/2007 | |
| DE | 102009051529 | A1 | * | 5/2011 | E05B 77/38 |
| DE | 102017109064 | A1 | * | 10/2018 | E05B 77/38 |
| FR | 2956146 | A1 | * | 8/2011 | E05B 77/36 |
| JP | S6369272 | U | | 5/1998 | |
| JP | S6436477 | U | | 3/1999 | |
| JP | 2003301646 | A | * | 10/2003 | E05B 77/38 |
| KR | 100921968 | B1 | * | 10/2009 | |
| WO | 2006133673 | A1 | | 12/2006 | |
| WO | WO-2011057617 | A1 | * | 5/2011 | E05B 77/38 |
| WO | WO-2018188683 | A1 | * | 10/2018 | E05B 77/38 |

OTHER PUBLICATIONS

Computer Generated Translation for FR 2956146 A1, Generated on Nov. 30, 2021, https://worldwide.espacenet.com/ (Year: 2021).*
Computer Generated Translation for DE102017109064A1, Generated on Sep. 9, 2022, https://worldwide.espacenet.com/ (Year: 2022).*
Computer Generated Translation for DE 102009051529 A1, Generated on May 18, 2023, https://worldwide.espacenet.com/ (Year: 2023).*
International Search Report dated Mar. 14, 2019 for related International Patent Application No. PCT/US2018/100746.

* cited by examiner

MOTOR VEHICLE LOCK WITH BRAKING ELEMENT

FIELD OF INVENTION

The invention relates to a motor vehicle lock for a movable vehicle part, in particular for a door, sliding door, flap, tailgate or bonnet according to independent claim 1, and to a method for reducing the opening noise according to the independent method claim.

BACKGROUND

From the prior art, locks are known that have a damping layer or casing on the rotary latch with the intention of reducing unpleasant noises. DE 10 2006 028 423 A1 discloses a rotary latch comprising a casing of this type, the rotary latch being formed, in particular in the region of the fork-shaped entry slot, with a damping layer for noise reduction. However, a drawback of the solutions known from the prior art is that only creaking noises between the rotary latch and a striker in the locked position are prevented. However, noises that occur when the blocked position is opened and the rotary latch is thus released cannot be reduced.

SUMMARY OF INVENTION

Therefore, the object of the present invention is to mitigate the drawbacks known from the prior art at least in part. In particular, the object of the invention is to reduce opening noises of the rotary latch. Moreover, the object of the invention is to provide a solution that is and in particular that can be produced cost-effectively and without great complexity of construction.

To achieve the object, a lock for a movable part of a vehicle, in particular for a door, flap, tailgate or bonnet, is proposed. The lock has a lock housing, a lock plate and at least one rotary latch that is located movably on the lock housing and/or the lock plate, the rotary latch being movable into an open position and at least one engaged position. Further, at least one buffer unit is provided, located on the lock housing and/or the lock plate, preferably in the entry region of a receiver/striker, at least one braking element being located on the buffer unit, so that at least some portions of the braking element can be brought into contact with the rotary latch, at least while the rotary latch is moving into the open position.

Further features and details that are disclosed in relation to the lock are also valid in relation to the method according to the invention and vice versa. Thus, the features set out in the description and claims may each be essential to the invention individually per se or in combination.

According to the invention, the braking element is located on the buffer unit so that a braking torque/braking force is transmissible to the rotary latch. If the rotary latch is now released from the blocked position and moves toward the open position, in which a receiver (which may also be denoted as a striker) is released, the rotary latch is braked and the unpleasant opening noise is at least reduced or eliminated.

Conventionally, a pawl holds the rotary latch in the blocked position thereof with a locking torque. If the pawl is now pivoted out of the blocked position, a lateral contour region of the rotary latch slides over an adjacent lateral blocking contour region of the pawl, and is finally moved away over an edge of the pawl. If the lateral contour region of the rotary latch slides beyond this pawl edge, the rotary latch is subsequently strongly accelerated in the manner of an impulse. In order for this acceleration to be controlled or braked, the braking element according to the invention is provided, and acts on the rotary latch when the pawl is being pivoted out and the rotary latch is thus moving toward the open position. The contacting thus brings about grinding or friction of the rotary latch against the braking element, causing the acceleration to be braked at least in portions.

In the context of the invention, it may be provided that a plurality of braking elements are located on the buffer unit. These can be located offset from and/or adjacent to one another and be brought into contact at different positions on the rotary latch. In this way, the braking force or braking torque can be increased. The braking element is formed substantially as a convex local elevation on the buffer unit. It is conceivable for the braking element to extend out of the buffer unit cylindrically, rectangularly, as a bulge or in a pyramid. The height of the braking element corresponds to at least the constructionally predefined distance between the rotary latch and the buffer unit, so that contacting can be enabled. Preferably, the braking element has a height between approximately 1 mm and approximately 10 mm, preferably between approximately 2.5 mm and approximately 5 mm.

Alternatively or in addition, the buffer unit may have at least one buffer pocket. In particular, the braking element can be located in the buffer pocket in a positive and/or adhesive and/or non-positive fit. By way of the buffer pocket, a further noise reduction may be achievable, since the buffer pocket can reduce the transmission of vibrations within the buffer unit. The buffer pocket is preferably formed as a material clearance in the buffer unit, and can thus further reduce the transmission of vibrations or braking noises. The braking element may for example be plugged, screwed or pressed into the buffer pocket. Moreover, the buffer pocket may have a clip connection or ratchet connection, so that the braking element can be clipped or ratcheted in the buffer pocket.

Preferably, the braking element is formed of a plastics material, in particular an elastomer. It is further conceivable for the braking element to comprise a multi-component plastics material. Plastics material is cost-effective and moreover has good braking properties. For example, the braking element may comprise thermoplastics. The use of plastics material, in particular elastomer and/or thermoplastic, makes possible a formation of the braking element that is deformable at least in part. The braking element may, at least in portions, have a Shore D hardness between approximately 40 and approximately 80, preferably between approximately 50 and approximately 65. Moreover, it is conceivable for the braking element, at least in portions, to have a Shore A hardness of less than 80, preferably less than 70 and particularly preferably less than 60. Advantageously, the plastics material has a high coefficient of friction, increasing the braking effect.

It is likewise conceivable for the braking element to be formed in a single piece with, in particular materially integrally with, the buffer unit. As a result, cost-effective manufacture can be made possible while the constructional complexity is low. Further, a weight-optimized construction shape can be achieved while the freedom of construction can be increased. Thus, the buffer unit and the braking element may be formed as a plastics material injection-moulded part.

Advantageously, the braking element has a braking contour that is formed substantially hemispherical, in particular with a radius between approximately 1 mm and approximately 5 mm, preferably between approximately 2 mm and approximately 3 mm. It is likewise conceivable for the braking element to be formed as a substantially elongate brake pad, a longitudinal face being bringable into contact with the rotary latch. A longitudinal face/contact face of this type may further have a surface structure, making it possible to improve the braking properties. For example, the surface may be formed roughened, ribbed or smoothed in the longitudinal and/or transverse direction. Noise can thus be minimized so that squeaking of the rotary latch and braking element are greatly reduced. Further, it may be advantageous if the braking element is formed wedge-shaped at least in portions. In this case, the wedge-shaped face is the face located substantially perpendicular to the movement direction of the rotary latch.

It is conceivable for the braking element to be bringable into contact with a ratchet arm of the rotary latch, in particular a longitudinal face of the ratchet arm. This makes a constructionally simple solution possible, since the buffer unit is conventionally located parallel to the ratchet arm, in particular parallel to the longitudinal face of the ratchet arm. The convexly formed braking element thus extends toward the ratchet arm, and thus contacts the longitudinal face along the movement direction of the ratchet arm with respect to the stationary braking element, which advantageously is received in the lock housing, so that the braking force can act on the rotary latch. The ratchet arm may also be denoted as a capture arm.

It is preferred for a braking face to be formed on the ratchet arm, in particular on the longitudinal face, the braking face being formed geometrically larger than the surface area of the braking element that can be brought into contact with the braking face. The braking face of the ratchet arm of the rotary latch is preferably formed as a contour, the braking element being movable, and thus bringable into contact, in the region of the contour. In order for contacting to be reliably achievable even in the event of unusual movements and/or shocks, the braking face is formed geometrically larger than the surface of the braking element that can be brought into contact with the braking face. It can thus be ensured that the braking element is always located in the region of the braking face during the contacting. In the context of the invention, the longitudinal face is intended to describe the face of the rotary latch that, in the installed state, is located parallel to the wall of the lock housing or lock plate on which the rotary latch is rotatably mounted.

Advantageously, the braking element is formed resilient at least in portions. Deformation of the braking element can increase the braking effect and/or the contact area of the braking element and rotary latch when the braking element presses against the rotary latch.

To achieve the object, a further aspect of the invention claims a method for reducing the opening noise of a rotary latch of a motor vehicle lock according to the invention, in particular a door lock, sliding door lock, tailgate lock and/or bonnet lock of a vehicle. A braking element exerts a braking torque on the rotary latch, at least during an opening movement of the rotary latch, reducing the opening speed of the rotary latch so that opening noises can be reduced. For unblocking, the rotary latch is released by the pawl. As a result of the force of the door seal, which acts on the door and pushes it toward the open position, a force acts on the rotary latch toward the open position, so that the latch rotates about an axis of rotation and can release a receiver. If the pawl is pivoted out of the blocked position, an outer contour region of the rotary latch slides over an adjacent locking contour region of the pawl and is ultimately moved beyond an edge of the pawl. If the outer contour region of the rotary latch slides beyond this pawl edge, the rotary latch is subsequently strongly accelerated in the manner of an impulse. The braking element according to the invention is positioned so that, immediately after the rotary latch is released by the pawl, the braking element contacts the rotary latch. The braking effect now occurs as a result of grinding or friction of the braking element against the rotary latch as a result of the engagement of the rotary latch and of the braking element located on the buffer unit.

Thus, a method according to the invention brings about the same advantages that were explicitly disclosed in relation to a lock according to the invention.

BRIEF DESCRIPTION OF DRAWINGS

Further measures that improve the invention may be derived from the following description of exemplary embodiments of the invention, which are shown schematically in the drawings. All features or advantages prescribed by the claims, description or drawings, including construction details, spatial arrangement and method steps, may be essential to the invention both per se and in a wide range of combinations. In the drawings:

Figure 1:
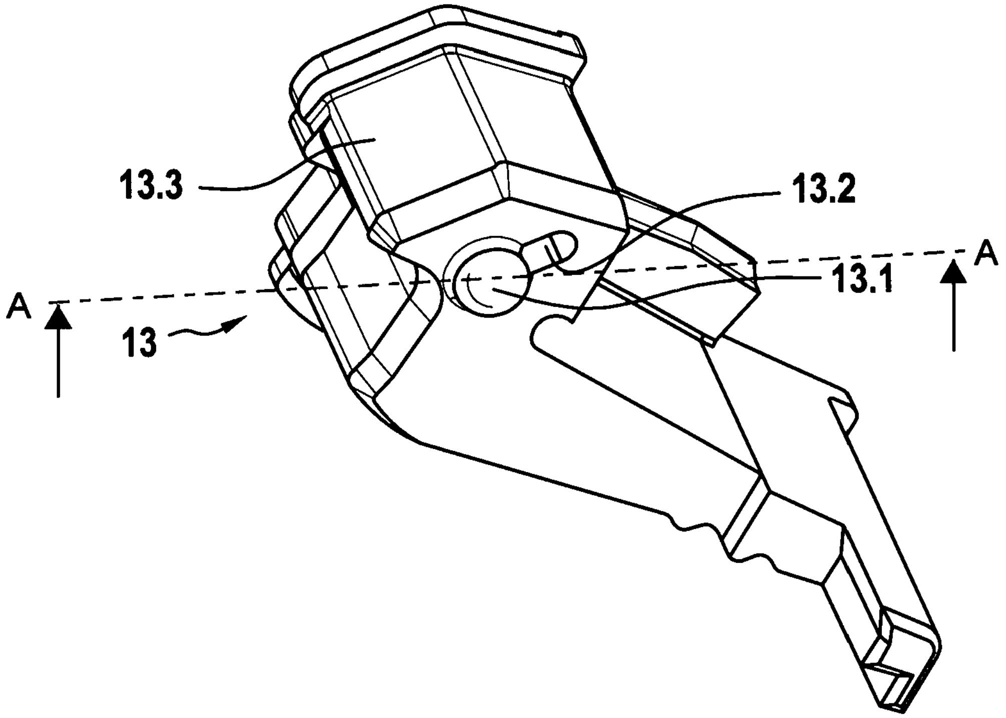
FIG. 1 shows a possible embodiment of the buffer unit according to the invention comprising a braking element.

Elements having like function and mode of operation are denoted by like reference signs in the drawings.

DETAILED DESCRIPTION

FIG. 1 shows a possible embodiment of a buffer unit 13 according to the invention comprising 35 a braking element 13.1, the braking element 13.1 being located in a buffer pocket 13.2. The buffer pocket 13.2 is formed as a material clearance in the form of a slot. One end of the braking element 13.1 protrudes from the buffer pocket 13.2 of the buffer unit 13. The projecting end is formed hemispherical in FIG. 1. The hemispherical part of the braking element 13.1 can be brought into contact with a rotary latch, so that a braking force is transmitted to the rotary latch and the noises when the rotary latch is unblocked can be reduced.

Figure 2:
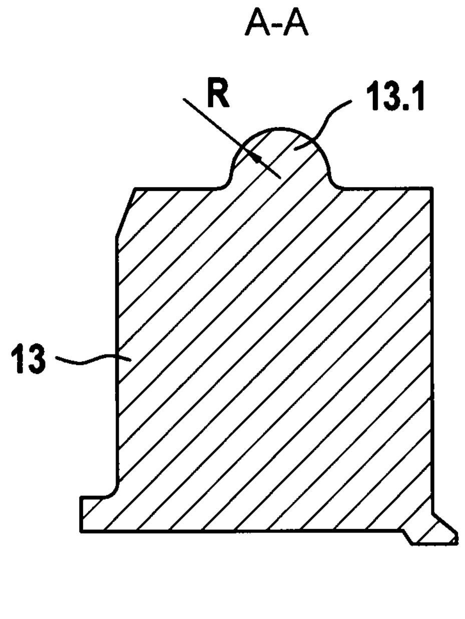
FIG. 2 is a sectional view of a possible embodiment of the buffer unit comprising a braking element.

FIG. 2 is a sectional view, along a line A-A, of an embodiment of the buffer unit 13 of FIG. 1. The braking element 13.1 is formed on the buffer unit 13 in a single piece with the buffer unit 13. A hemispherical region of the braking element 13.1 extends out of the buffer unit 13, so that contacting with a rotary latch is achievable. At the hemispherical end, the braking element 13.1 preferably has a radius R between approximately 1 mm and approximately 5 mm, preferably between approximately 2 mm and approximately 3 mm.

Figure 3:
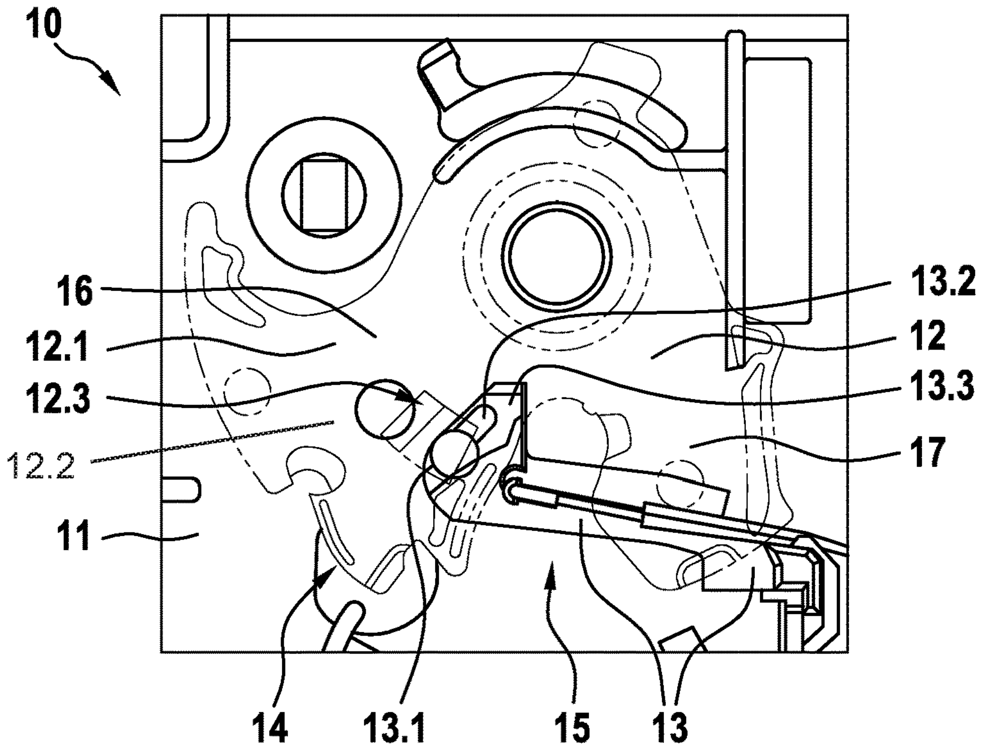
FIG. 3 shows a possible embodiment of a lock according to the invention in a ratchet position.

FIG. 3 shows a possible embodiment of a lock 10 according to the invention comprising a lock housing 11 and a rotary latch 12 located movably on the lock housing. In FIG. 1, the rotary latch 12 is in a blocked position, in particular a main ratchet position. In this context, the rotary latch 12 has a blocking contour 14 that can be brought into an operative connection with at least one pawl (not shown). Further, a buffer unit 13 is located on the lock housing 11, preferably in a positive fit, the buffer unit 13 being located behind the rotary latch 12 in the view shown.

In FIG. 3, the buffer unit 13 extends substantially transverse to the fork-shaped entry slot 15 of the rotary latch 12; in other words, in the perspective shown, the buffer unit 13 is located horizontally with respect to the shown position of the entry slot 15. On the buffer unit 13, the braking element 13.1 is located on one end 13.3 and contacts the rotary latch 12 on a longitudinal face in the region of the braking face 12.3. The braking face 12.3 may preferably be of a length between approximately 0.25 mm and approximately 25 mm, preferably between approximately 5 mm and approximately 7 mm. At the braking face 12.3, the rotary latch 12 and braking element 13.1 have substantially continuous contact with one another, so that a braking force acts on the rotary latch 12 and unpleasant opening noises can be reduced. The rotary latch has a ratchet arm 16 and a load arm 17, the braking face 12.3 being located on the ratchet arm 16.

Figure 4:
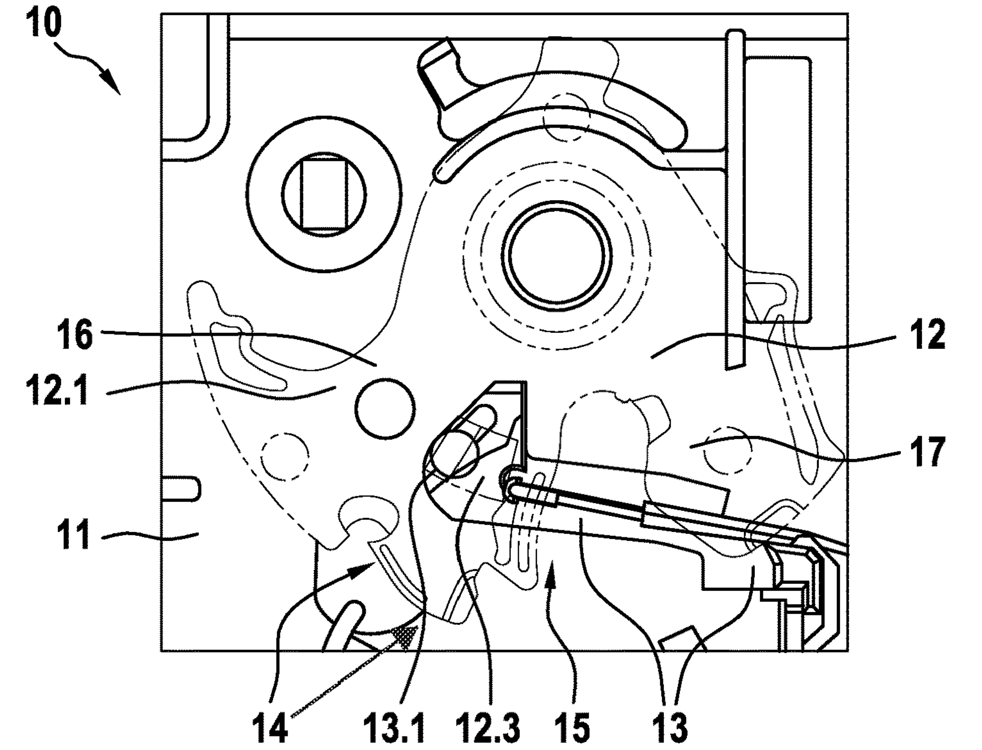
FIG. 4 shows the embodiment of FIG. 3 upon leaving a braking region.

FIG. 4 shows the exemplary embodiment of FIG. 3, the rotary latch 12 here having been moved toward the open position and leaving the braking face 12.3. After leaving the braking face 12.3, the rotary latch 12 may be moved toward the open position substantially unbraked. No further contacting between the braking element 13.1 and rotary latch 12 takes place once the braking element 13.1 has left the braking face 12.3 and thus disengaged itself.

In the context of the invention, it may be provided that at least a second braking element is located on the buffer unit 13. The second braking element may for example be located parallel to and/or in succession with the first braking element 13.1 and/or be bringable into contact with the load arm 17 and/or the braking face 12.3. The at least second braking element can thus reinforce the braking effect.

The above explanation of embodiments describes the present invention purely in the context of examples. Naturally, individual features of embodiments may be combined freely with one another, so long as this makes technical sense, without departing from the scope of the present invention.

LIST OF REFERENCE SIGNS

- 10 Lock
- 11 Lock housing
- 12 Rotary latch
- 12.1 Ratchet arm
- 12.2 Longitudinal face
- 12.3 Braking face
- 13 Buffer unit
- 13.1 Braking element
- 13.2 Buffer pocket
- 13.3 End of buffer unit 13
- 14 Blocking contour
- 15 Entry slot of 12
- 16 Ratchet arm
- 17 Load arm
- R Radius of braking element 13.1

The invention claimed is:

1. A motor vehicle lock for a movable vehicle part, said lock comprising:

a lock housing, a rotary latch that is movably provided on the lock housing, the rotary latch being movable into an open position and at least one engaged position, and a buffer unit that is provided on the lock housing and includes a braking element being located on the buffer unit, wherein the braking element is brought into contact with a braking face formed on a longitudinal face of the rotary latch, at least while the rotary latch is moving into the open position, wherein the braking element is stationary with respect to the rotary latch while the rotary latch is moving, wherein the braking element protrudes from a surface of the buffer unit parallel to a rotational axis of the rotary latch, wherein the buffer unit has a buffer pocket and the braking element is located in the buffer pocket, and wherein the buffer pocket includes a material clearance in the buffer unit and the material clearance extends as a slot, wherein the slot extends outwardly in the buffer unit from a portion of the buffer pocket that includes the braking element, wherein the buffer unit includes an elbowed planar surface with a first portion and a second portion that extends transversely to the first portion, and wherein the second portion is smaller than the first portion, wherein the buffer pocket is formed in the second portion.

2. The motor vehicle lock according to claim 1, wherein the braking element comprises a plastics material.

3. The motor vehicle lock according to claim 2, wherein the plastics material is an elastomer.

4. The motor vehicle lock according to claim 1, wherein the braking element has a braking contour that is substantially hemispherical.

5. The motor vehicle lock according to claim 4, wherein the braking contour has a radius that is between approximately 1 mm and approximately 5 mm.

6. The motor vehicle lock according to claim 5, wherein the radius is between approximately 2 mm and approximately 3 mm.

7. The motor vehicle lock according to claim 1, wherein the braking element is brought into contact with a ratchet arm of the rotary latch having the braking face.

8. The motor vehicle lock according to claim 7, wherein the braking face is formed geometrically larger than a surface area of the braking element that is brought into contact with the braking face.

9. The motor vehicle lock according to claim 8, wherein the rotary latch and the braking element have continuous contact with each other along the braking face.

10. The motor vehicle lock according to claim 1, wherein the braking element is resilient at least in portions.

11. The motor vehicle lock according to claim 1, wherein the braking element is located in the buffer pocket in a positive fit.

12. The motor vehicle lock according to claim 1, wherein the buffer unit extends transversely to an entry slot of the rotary latch.

13. A method for reducing an opening noise of the rotary latch of the motor vehicle lock of claim 1, the method comprising:

exerting a braking torque on the rotary latch via the braking element; and, reducing an opening speed of the rotary latch at least during an opening movement of the rotary latch to the open position.

14. A motor vehicle lock for a movable vehicle part, said lock comprising:

a lock housing, a rotary latch that is movably provided on the lock housing, the rotary latch being movable into an open position and at least one engaged position, and a buffer unit that is provided on the lock housing and includes a braking element being located on the buffer unit, wherein the braking element is brought into contact with a braking face formed on a longitudinal face of the rotary latch, at least while the rotary latch is moving into the open position, wherein the braking element is stationary with respect to the rotary latch while the rotary latch is moving, wherein the braking element protrudes from a surface of the buffer unit parallel to a rotational axis of the rotary latch, wherein the buffer unit has a buffer pocket and the braking element is located in the buffer pocket, and wherein the buffer pocket includes a material clearance in the buffer unit and the material clearance extends as a slot, wherein the slot extends outwardly in the buffer unit from a portion of the buffer pocket that includes the braking element, wherein the surface of the buffer unit faces the longitudinal face of the rotary latch, wherein the slot extends into the buffer unit from the surface of the buffer unit.

* * * * *